United States Patent
Laughlin

(10) Patent No.: US 10,094,219 B2
(45) Date of Patent: Oct. 9, 2018

(54) ADIABATIC SALT ENERGY STORAGE

(75) Inventor: Robert B. Laughlin, Stanford, CA (US)

(73) Assignee: X Development LLC, Mountain View, CA (US)

(*) Notice: Subject to any disclaimer, the term of this patent is extended or adjusted under 35 U.S.C. 154(b) by 67 days.

(21) Appl. No.: 12/932,775

(22) Filed: Mar. 4, 2011

(65) Prior Publication Data

US 2016/0298455 A1    Oct. 13, 2016

Related U.S. Application Data

(60) Provisional application No. 61/339,577, filed on Mar. 4, 2010.

(51) Int. Cl.
| | |
|---|---|
| *F25B 11/02* | (2006.01) |
| *F01K 25/10* | (2006.01) |
| *F02C 6/14* | (2006.01) |
| *F01D 1/02* | (2006.01) |
| *F01K 5/00* | (2006.01) |

(52) U.S. Cl.
CPC . *F01D 1/02* (2013.01); *F01K 5/00* (2013.01)

(58) Field of Classification Search
CPC ....... Y02E 10/46; Y02E 60/142; F01K 25/10; F01K 25/00; F01K 3/12; F02C 1/04; F02C 6/14; F25B 9/06; F25B 9/004; F25B 11/02
USPC ...... 62/87, 401, 434; 60/616, 620, 682, 645, 60/659
See application file for complete search history.

(56) References Cited

U.S. PATENT DOCUMENTS

| | | | |
|---|---|---|---|
| 2,065,974 | A | 12/1936 | Marguerre |
| 2,246,513 | A | 6/1941 | Hammond |
| 2,791,204 | A | 5/1957 | Andrus |
| 2,860,493 | A | 11/1958 | Capps et al. |
| 3,152,442 | A | 10/1964 | Rowekamp |

(Continued)

FOREIGN PATENT DOCUMENTS

| | | |
|---|---|---|
| DE | 202013004654 | 8/2014 |
| EP | 0003980 | 9/1979 |

(Continued)

OTHER PUBLICATIONS

Way, "Storing the sun: Molten salt provides highly efficient thermal storage", 2008, Internet.

(Continued)

*Primary Examiner* — Frantz Jules
*Assistant Examiner* — Martha Tadesse
(74) *Attorney, Agent, or Firm* — McDonnell Boehnen Hulbert & Berghoff LLP

(57) ABSTRACT

Efficient energy storage is provided by using a working fluid flowing in a closed cycle including a ganged compressor and turbine, and capable of efficient heat exchange with heat storage fluids on a hot side of the system and on a cold side of the system. This system can operate as a heat engine by transferring heat from the hot side to the cold side to mechanically drive the turbine. The system can also operate as a refrigerator by mechanically driving the compressor to transfer heat from the cold side to the hot side. Heat exchange between the working fluid of the system and the heat storage fluids occurs in counter-flow heat exchangers. In a preferred approach, molten salt is the hot side heat storage fluid and water is the cold side heat storage fluid.

20 Claims, 4 Drawing Sheets

(56) References Cited

U.S. PATENT DOCUMENTS

| | | | |
|---|---|---|---|
| 3,220,191 A * | 11/1965 | Berchtold | F02C 9/24 138/30 |
| 3,630,022 A | 12/1971 | Jubb | |
| 3,897,170 A | 7/1975 | Darvishian | |
| 3,955,359 A | 5/1976 | Yannone et al. | |
| 4,024,908 A * | 5/1977 | Meckler | F24F 5/0046 165/225 |
| 4,054,124 A * | 10/1977 | Knoos | F24S 50/40 126/584 |
| 4,089,744 A * | 5/1978 | Cahn | F01K 3/00 376/322 |
| 4,094,148 A | 6/1978 | Nelson | |
| 4,110,987 A * | 9/1978 | Cahn | F01K 3/00 60/652 |
| 4,148,191 A | 4/1979 | Frutschi | |
| 4,158,384 A * | 6/1979 | Brautigam | 165/236 |
| 4,215,553 A | 8/1980 | Poirier et al. | |
| 4,408,654 A | 10/1983 | Doomernik | |
| 4,430,241 A | 2/1984 | Fiorucci | |
| 4,444,024 A | 4/1984 | McFee | |
| 4,438,630 A | 5/1984 | Rowe | |
| 4,479,352 A * | 10/1984 | Yamaoka | F01K 3/00 60/652 |
| 4,523,629 A | 6/1985 | Copeland | |
| 4,583,372 A | 4/1986 | Egan et al. | |
| 4,628,692 A | 12/1986 | Pierce | |
| 4,643,212 A | 2/1987 | Rothrock | |
| 4,727,930 A * | 3/1988 | Bruckner | F02C 1/05 165/111 |
| 5,269,145 A | 12/1993 | Krause et al. | |
| 5,537,822 A * | 7/1996 | Shnaid et al. | 60/659 |
| 5,644,928 A | 7/1997 | Uda et al. | |
| 5,653,656 A | 8/1997 | Thomas et al. | |
| 5,653,670 A | 8/1997 | Endelman | |
| 6,119,682 A * | 9/2000 | Hazan | F24D 17/0068 126/638 |
| 6,629,413 B1 | 10/2003 | Wendt et al. | |
| 6,644,062 B1 | 11/2003 | Hays | |
| 6,701,711 B1 | 3/2004 | Litwin | |
| 7,028,481 B1 | 4/2006 | Morrow | |
| 7,086,231 B2 | 8/2006 | Pinkerton | |
| 7,299,633 B2 | 11/2007 | Murphy et al. | |
| 7,458,418 B2 | 12/2008 | Sienel | |
| 7,603,858 B2 * | 10/2009 | Bennett | F01L 1/46 60/517 |
| 7,937,930 B1 * | 5/2011 | Dunn | F02C 7/10 60/39.511 |
| 7,954,320 B2 | 6/2011 | Ellensohn et al. | |
| 8,113,011 B2 | 2/2012 | Howes et al. | |
| 8,206,075 B2 | 6/2012 | White et al. | |
| 8,403,613 B2 | 3/2013 | van der Meulen | |
| 8,424,284 B2 | 4/2013 | Staffend et al. | |
| 8,453,677 B2 | 6/2013 | Howes et al. | |
| 8,496,026 B2 | 7/2013 | Howes et al. | |
| 8,500,388 B2 | 8/2013 | van der Meulen et al. | |
| 8,613,195 B2 | 12/2013 | Held et al. | |
| 8,656,712 B2 | 2/2014 | Howes et al. | |
| 8,671,686 B2 | 3/2014 | Pinkerton et al. | |
| 8,826,664 B2 | 9/2014 | Howes et al. | |
| 8,833,079 B2 | 9/2014 | Smith | |
| 8,833,101 B2 | 9/2014 | Howes et al. | |
| 8,863,641 B2 | 10/2014 | Howes | |
| 8,904,793 B2 | 12/2014 | Hemrle et al. | |
| 9,316,121 B2 | 4/2016 | Davidson et al. | |
| 9,518,786 B2 | 12/2016 | Howes et al. | |
| 2001/0054449 A1 | 12/2001 | Jones et al. | |
| 2003/0131623 A1 | 7/2003 | Suppes | |
| 2004/0008010 A1 | 1/2004 | Ebrahim et al. | |
| 2004/0083731 A1 | 5/2004 | Lasker | |
| 2004/0088980 A1 | 5/2004 | Emmel et al. | |
| 2005/0126171 A1 | 6/2005 | Lasker | |
| 2006/0035591 A1 | 2/2006 | Young et al. | |
| 2006/0053792 A1 * | 3/2006 | Bourgeois | C25B 1/04 60/670 |
| 2006/0137869 A1 | 6/2006 | Steinhauser | |
| 2006/0185626 A1 | 8/2006 | Allen et al. | |
| 2006/0248886 A1 | 11/2006 | Ma | |
| 2007/0295673 A1 * | 12/2007 | Enis et al. | 210/766 |
| 2008/0121387 A1 | 5/2008 | Taniguchi et al. | |
| 2009/0126377 A1 * | 5/2009 | Shibata et al. | 62/87 |
| 2009/0179429 A1 | 7/2009 | Ellis et al. | |
| 2010/0024421 A1 * | 2/2010 | Litwin | F02C 1/05 60/641.8 |
| 2010/0251711 A1 * | 10/2010 | Howes et al. | 60/659 |
| 2010/0251712 A1 * | 10/2010 | Nakhamkin | 60/659 |
| 2010/0257862 A1 * | 10/2010 | Howes | F01K 3/06 60/682 |
| 2010/0275616 A1 | 11/2010 | Saji et al. | |
| 2010/0301062 A1 | 12/2010 | Litwin et al. | |
| 2010/0301614 A1 * | 12/2010 | Ruer | F01K 3/12 290/1 A |
| 2011/0100010 A1 * | 5/2011 | Freund et al. | 60/659 |
| 2011/0100011 A1 | 5/2011 | Staffend | |
| 2011/0100356 A1 | 5/2011 | Bliesner | |
| 2011/0100611 A1 * | 5/2011 | Ohler | F01K 3/00 165/104.28 |
| 2011/0126539 A1 | 6/2011 | Ramaswamy et al. | |
| 2011/0139407 A1 | 6/2011 | Ohler et al. | |
| 2011/0196542 A1 | 8/2011 | Pinkerton et al. | |
| 2011/0227066 A1 | 9/2011 | Umezaki | |
| 2011/0262269 A1 | 10/2011 | Lior | |
| 2011/0277471 A1 * | 11/2011 | Shinnar | F03G 6/04 60/641.14 |
| 2011/0283700 A1 * | 11/2011 | Zohar | F03G 6/067 60/641.15 |
| 2011/0289941 A1 | 12/2011 | Gonzalez et al. | |
| 2011/0314839 A1 | 12/2011 | Brook et al. | |
| 2012/0039701 A1 | 2/2012 | Diddi et al. | |
| 2012/0047892 A1 | 3/2012 | Held et al. | |
| 2012/0055661 A1 | 3/2012 | Feher | |
| 2012/0060501 A1 | 3/2012 | Hemrle et al. | |
| 2012/0222423 A1 | 9/2012 | Mercangoez et al. | |
| 2012/0267955 A1 | 10/2012 | Zhan et al. | |
| 2012/0312496 A1 | 12/2012 | Howes et al. | |
| 2012/0319410 A1 | 12/2012 | Ambrosek et al. | |
| 2013/0105127 A1 | 5/2013 | Postma et al. | |
| 2013/0118344 A1 | 5/2013 | Howes et al. | |
| 2013/0125546 A1 | 5/2013 | Barmeier et al. | |
| 2013/0197704 A1 | 8/2013 | Pan et al. | |
| 2013/0276917 A1 | 10/2013 | Howes et al. | |
| 2014/0008033 A1 | 1/2014 | Howes et al. | |
| 2014/0014290 A1 | 1/2014 | Howes et al. | |
| 2014/0014302 A1 | 1/2014 | Gutai | |
| 2014/0060051 A1 | 3/2014 | Ohler et al. | |
| 2014/0075970 A1 | 3/2014 | Benson | |
| 2015/0034188 A1 | 2/2015 | Howes | |
| 2015/0069758 A1 | 3/2015 | Davidson et al. | |
| 2015/0084567 A1 | 3/2015 | Howes | |
| 2015/0113940 A1 | 4/2015 | Sinatov et al. | |
| 2015/0114217 A1 | 4/2015 | Howes | |
| 2015/0114591 A1 | 4/2015 | Howes et al. | |
| 2015/0211386 A1 | 7/2015 | Howes et al. | |
| 2015/0260463 A1 | 9/2015 | Laughlin et al. | |
| 2015/0267612 A1 | 9/2015 | Bannari | |
| 2015/0361832 A1 | 12/2015 | Franke et al. | |
| 2016/0018134 A1 | 1/2016 | Ueda et al. | |
| 2016/0030856 A1 | 2/2016 | Kaplan et al. | |
| 2016/0032783 A1 | 2/2016 | Howes et al. | |
| 2016/0248299 A1 | 8/2016 | Ouvry | |
| 2016/0290281 A1 | 10/2016 | Schmatz | |
| 2016/0298455 A1 | 10/2016 | Laughlin | |
| 2016/0298495 A1 | 10/2016 | Laughlin | |

FOREIGN PATENT DOCUMENTS

| | | |
|---|---|---|
| EP | 1577548 A1 | 9/2005 |
| EP | 1857614 | 11/2007 |
| EP | 2241737 A1 | 10/2010 |
| EP | 2275649 A1 | 1/2011 |
| EP | 2312129 A1 | 4/2011 |
| EP | 2390473 A1 | 11/2011 |
| EP | 2400120 A1 | 12/2011 |

(56) References Cited

FOREIGN PATENT DOCUMENTS

| | | |
|---|---|---|
| EP | 2441925 A1 | 4/2012 |
| EP | 2441926 A1 | 4/2012 |
| EP | 2532843 A1 | 12/2012 |
| JP | H 08-93633 A | 4/1996 |
| JP | 2011106755 | 6/2011 |
| KR | 1020040045337 | 6/2004 |
| KR | 1020120042921 | 5/2012 |
| KR | 101370843 | 3/2014 |
| KR | 1020150089110 | 8/2015 |
| WO | 2005/019756 | 3/2005 |
| WO | 2011/161094 | 12/2011 |
| WO | 2013/094905 | 6/2013 |
| WO | 2013164653 A1 | 11/2013 |
| WO | 2015/185891 | 10/2015 |
| WO | 2016/000016 | 1/2016 |

OTHER PUBLICATIONS

Wesoff, "Breakthrough in energy storage: Isentropic Energy", Feb. 23, 2010, Internet.
Turchi, "NREL advanced concepts", May 27, 2010, Solar Energy Technologies Program Peer Review.
Boyce, "Axial-Flow compressors", 2003 (date estimated), Internet.
U.S. Appl. No. 13/965,048, filed Aug. 12, 2013, Laughlin.
Bauer, et al. Sodium nitrate for high temperature latent heat storage. 11th Int. Conf. Thermal Energy Storage Effstock. Jun. 14, 2009.
Bradshaw, et al. Molten Nitrate Salt Development for Thermal Energy Storage in Parabolic Trough Solar Power Systems. ES2008-54174, ASME 2008 2nd Intl. Conf. On Energy Sustainability, vol. 2, (2008), p. 631.
Dewing. Heat Capacities of Liquid Sodium and Potassium Nitrates. Journal of Chemical and Engineering Data. 1975; 20(3):221-223.
Diguilio, et al. The Thermal Conductivity of the Molten NaNO3—KNO3 Eutectic Between 525 and 590 K. International Journal of Thermophysics. 1992; 13(4):575-592.
Freeman. The Kinetics of the Thermal Decomposition of Sodium Nitrate and of the Reaction Between Sodium Nitrate and Oxygen, J. Am. Chem. Soc. 957; 79(838):1487-1493.
International search report and written opinion dated Jan. 2, 2014 for PCT/US2013/062469.
Isentropic. A new era in electrical energy storage and recovery. 2014. http://www.isentropic.co.uk/our-phes-technology.
Laughlin. Here Comes the Sun. Stanford Physics Department Colloquium. Jan. 5, 2010.
Nunes, et al. Viscosity of Molten Sodium Nitrate. International Journal of Thermophysics. 2006; 27(6):1638-1649.
Parsons. Cost Estimates for Thermal Peaking Power Plant, Parsons Brinckerhoff New Zealand Ltd., 2008.
Peng, et al. High-temperature thermal stability of molten salt materials. Int. J. Energy Res. 2008; 32:1164-1174.
Pickett, et al. Heated Turbulent Flow of Helium-Argon Mixtures in Tubes. Int. J. Mass Transfer. 1979; 22:705-719.
Raade, et al. Development of Molten Salt Heat Transfer Fluid With Low Melting Point and High Thermal Stability. Journal of Solar Energy Engineering. 2011; 133:031013-1-031013-6.
Silverman, et al. Survey of Technology for Storage of Thermal Energy in Heat Transfer Salt. Oak Ridge National Laboratory, ORNL/TM-5682, Jan. 1977.
Vanco. Analytical Comparison of Relative Heat-Transfer Coefficients and Pressure Drops of Inert Gases and Their Binary Mixtures. U.S. National Aeronautics and Space Administration, NASA TN D-2677, Feb. 1965.
Yergovich, et al. Density and Viscosity of Aqueous Solutions of Methanol and Acetone from the Freezing Point to 10° C. Journal of Chemical and Engineering Data. 1971; 16(2):222-226.
Zabransky, et al. Heat Capacities of Organic Compounds in the liquid State I. C1 to C18 1-Alkanols. J. Phys. Chem. Ref. Data. 1990; 19(3):719-762.
U.S. Appl. No. 14/668,610, filed Mar. 25, 2015, Laughlin et al.
Desrues, et al. A Thermal Energy Storage Process for Large Scale Electric Applications. Applied Thermal Engineering 30 (2010): 425-432, Oct. 14, 2009.
International preliminary report on patentability and written opinion dated Mar. 31, 2015 for PCT Application No. US2013/062469.
Ruer, et al. Pumped Heat Energy Storage, pp. 1-14. Apr. 2010.
International Searching Authority, International Search Report and Written Opinion, dated Apr. 12, 2018, issued in connection with International Patent Application No. PCT/US2017/063519, field Nov. 28, 2017, 16 pages.
International Searching Authority, International Search Report and Written Opinion, dated Mar. 26, 2018, issued in connection with International Patent Application No. PCT/US2017/065645, filed Dec. 11, 2017, 16 pages.
International Searching Authority, International Search Report and Written Opinion, dated Mar. 27, 2018, issued in connection with International Patent Application No. PCT/US2017/065201, filed Dec. 7, 2017, 13 pages.
International Searching Authority, International Search Report and Written Opinion, dated Feb. 26, 2018, issued in connection with International Patent Application No. PCT/US2017/064074, filed Nov. 30, 2017, 13 pages.
International Searching Authority, International Search Report and Written Opinion, dated Mar. 26, 2018, issued in connection with International Patent Application No. PCT/US2017/065200, filed on Dec. 7, 2017, 15 pages.
International Searching Authority, International Search Report and Written Opinion, dated Mar. 20, 2018, issued in connection with International Patent Application No. PCT/US2017/064839, filed on Dec. 6, 2017, 13 pages.
International Searching Authority, International Search Report and Written Opinion, dated Mar. 29, 2018, issued in connection with International Patent Application No. PCT/US2017/065643, filed on Dec. 11, 2017, 17 pages.
International Searching Authority, International Search Report and Written Opinion, dated Feb. 22, 2018, issued in connection with International Patent Application No. PCT/US2017/062117, filed Nov. 17, 2017, 17 pages.
International Searching Authority, International Search Report and Written Opinion, dated Mar. 12, 2018, issued in connection with International Patent Application No. PCT/US2017/063521, filed Nov. 28, 2017, 18 pages.
International Searching Authority, International Search Report and Written Opinion, dated Mar. 29, 2018, issued in connection with International Patent Application No. PCT/US2017/067049, filed Dec. 18, 2017, 16 pages.
Non-Final Office Action dated May 14, 2018, issued in connection with U.S. Appl. No. 15/392,653, filed Dec. 28, 2016, 26 pages.
Non-Final Office Action dated Nov. 3, 2016, issued in connection with U.S. Appl. No. 12/932,775, filed Mar. 4, 2011, 17 pages.
Final Office Action dated Jul. 25, 2017, issued in connection with U.S. Appl. No. 12/932,775, filed Mar. 4, 2011, 19 pages.
Non-Final Office Action dated Feb. 8, 2018, issued in connection with U.S. Appl. No. 15/396,461, filed Dec. 31, 2016, 9 pages.
Non-Final Office Action dated May 14, 2018, issued in connection with U.S. Appl. No. 15/392,657, filed Dec. 28, 2016, 27 pages.
Frutschi, Hans Ulrich, "Closed-Cycle Gas Turbines", New York, NY, ASME, 2005, <http://ebooks.asmedigitalcollection.asme.org/books.aspx>, Jan. 29, 2016.
MacNaghten, James, "Commercial potential of different large scale thermal storage technologies under development globally", Isentropic Ltd, Jun. 9, 2016.
U.S. Appl. No. 61/706,337, filed Sep. 27, 2012.
U.S. Appl. No. 61/868,070, filed Aug. 20, 2013.
U.S. Appl. No. 15/392,523, filed Dec. 28, 2016.
U.S. Appl. No. 15/392,542, filed Dec. 28, 2016.
U.S. Appl. No. 15/392,571, filed Dec. 28, 2016.
U.S. Appl. No. 15/392,653, filed Dec. 28, 2016.
U.S. Appl. No. 15/392,657, filed Dec. 28, 2016.
U.S. Appl. No. 15/392,927, filed Dec. 28, 2016.
U.S. Appl. No. 15/393,874, filed Dec. 29, 2016.
U.S. Appl. No. 15/393,891, filed Dec. 29, 2016.
U.S. Appl. No. 15/394,572, filed Dec. 29, 2016.

(56) References Cited

OTHER PUBLICATIONS

U.S. Appl. No. 15/395,040, filed Dec. 30, 2016.
U.S. Appl. No. 15/395,622, filed Dec. 30, 2016.
International Search Report and Written Opinion, International Application No. PCT/US2017/063289, dated Apr. 16, 2018.
Non-Final Rejection, U.S. Appl. No. 13/363,574, dated Feb. 8, 2018.
Non-Final Office Action dated May 25, 2018, issued in connection with U.S. Appl. No. 15/393,874, filed Dec. 29, 2016, 28 pages.
Non-Final Office Action dated Jun. 28, 2018, issued in connection with U.S. Appl. No. 15/392,927, filed Dec. 28, 2016, 11 pages.
Final Office Action dated Jun. 6, 2018, issued in connection with U.S. Appl. No. 15/396,461, filed Dec. 31, 2016, 10 pages.
International Searching Authority, International Search Report and Written Opinion dated Jul. 30, 2018, issued in connection with International Patent Application No. PCT/US2017/064076, filed on Nov. 30, 2017, 15 pages.

\* cited by examiner

ADIABATIC SALT ENERGY STORAGE

CROSS REFERENCE TO RELATED APPLICATIONS

This application claims the benefit of U.S. provisional patent application 61/339,577, filed on Mar. 4, 2010, entitled "Adiabatic salt energy storage", and hereby incorporated by reference in its entirety.

FIELD OF THE INVENTION

This invention relates to energy storage.

BACKGROUND

Large scale energy storage is of considerable interest for power generation and distribution systems, to assist with exploitation of capricious energy sources such as wind and solar. At the moment, the main technology in wide use for reversibly storing electric power is hydropumping—drawing electricity off the grid to pump water uphill and then letting the water back down through power turbines later on. Hydropumping is highly efficient (about 80%) but suffers from (1) the need to allocate land to build dams and lakes, (2) the need for mountains, which aren't always available nearby, and (3) the need for water.

Recent developments in solar energy have revealed the substantial cost effectiveness of storing heat in tanks of molten salt for later use in generating electricity, by means of steam turbines, when the sun isn't shining. However, these storage facilities are adapted to store solar thermal energy, and are therefore not directly applicable to the storage of wind energy, which is mechanical energy as opposed to thermal energy. Molten salt has also been used as a primary coolant in nuclear reactors. Another approach for energy storage is considered in US 2010/0251711, where hot and cold storage tanks are employed in connection with heat storage.

However, efficiency is critical for energy storage, and it is especially critical for large scale energy storage. Therefore, it would be an advance in the art to provide energy storage having improved efficiency, especially for capricious sources of mechanical energy (e.g. wind energy).

SUMMARY

Improved energy storage is provided by using a working fluid flowing in a closed cycle including a ganged compressor and turbine, and capable of efficient heat exchange with heat storage fluids on a hot side of the system and on a cold side of the system. This system can operate as a heat engine by transferring heat from the hot side to the cold side to mechanically drive the turbine. The system can also operate as a refrigerator by mechanically driving the compressor to transfer heat from the cold side to the hot side. Heat exchange between the working fluid of the system and the heat storage fluids occurs in counter-flow heat exchangers.

Preferably, the hot side and cold side heat storage fluids each have a corresponding pair of storage tanks, where heat transfer to/from a heat storage fluid entails flow of the heat storage liquid between its two corresponding storage tanks. In a preferred approach, molten salt is the hot-side heat storage fluid and water is the cold-side heat storage fluid.

This approach provides numerous significant advantages. The use of the same compressor and turbine for both storage and retrieval provides substantial cost savings relative to approaches where storage and retrieval are performed in separate machinery. This cost savings is expected to be extremely significant, because the cost of the compressor and turbine (or equivalent machinery) is expected to be the most significant capital expense for a large scale energy storage plant. Molten salt provides numerous advantages as a thermal energy storage medium, such as low vapor pressure, lack of toxicity, low chemical reactivity with typical steels, and low cost. The low vapor pressure of molten salt is a highly significant safety advantage, as can be appreciated by considering hypothetically the use of steam as an energy storage medium in a large scale (e.g., 1 GW) thermal energy storage facility. A steam explosion from such a facility could have an explosive force on the order of thousands of tons of TNT. Using a closed loop for the working fluid advantageously increases cold-side heat transfer rates, allows a broader selection of working fluids, allows for operation at elevated cold-side pressure, improves efficiency, and reduces the risk of turbine damage.

DETAILED DESCRIPTION

Figure 1:
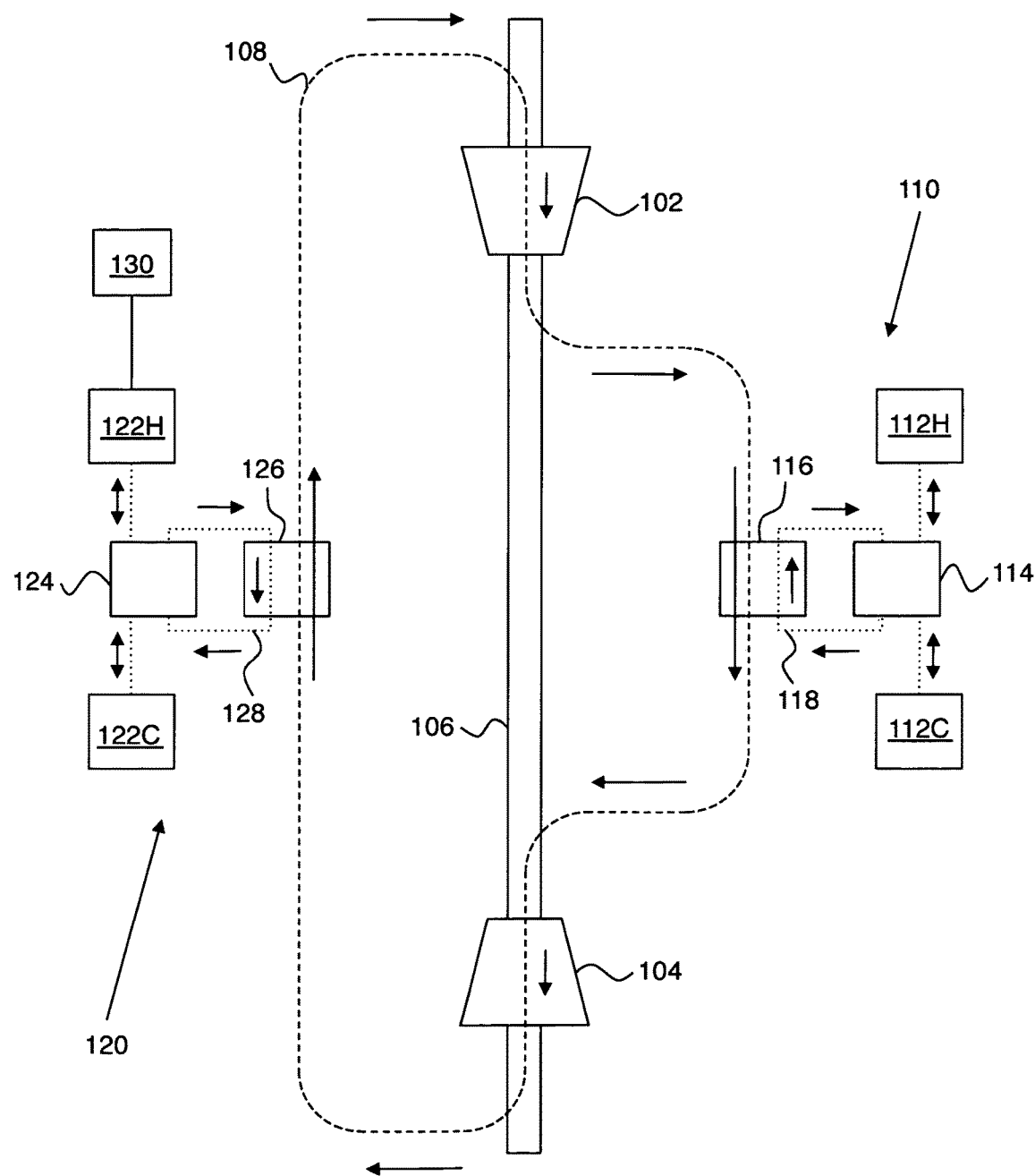
FIG. 1 shows an exemplary embodiment of the invention.

FIG. 1 shows an exemplary embodiment of the invention. In this example, a working fluid (schematically referenced as 108) flows in a closed cycle that includes, in sequence, a compressor 102, a first heat storage unit 110, a turbine 104, and a second heat storage unit 120. Compressor 102 and turbine 104 are ganged on a common mechanical shaft 106 such that they rotate together. Heat storage units 110 and 120 are both capable of exchanging heat with working fluid 108. For ease of illustration, pipes for defining the flow paths of fluids (e.g., working fluid 108) are not shown on FIGS. 1-3. Suitable pipes for the working fluid and heat storage fluids described herein are known in the art. As described in greater detail below, this apparatus is capable of operating as a heat engine (to provide mechanical work from heat) or as a refrigerator (to use mechanical work to store heat).

The purpose of heat storage units 110 and 120 is to provide stored heat to working fluid 108 and to remove heat from working fluid 108 for storage. It can be helpful to refer to first heat storage unit 110 as the hot-side heat storage unit, and to refer to second heat storage unit 120 as the cold-side heat storage unit. This terminology can be understood by noting that hot-side heat storage unit 110 adds heat to working fluid 108 at the same point in the cycle that combustion of fuel adds heat to air in a conventional jet engine. Thus, it can be helpful to regard hot-side heat storage unit 110 as being analogous to the fuel in a jet engine, when the apparatus is operating as a heat engine.

Figure 2:
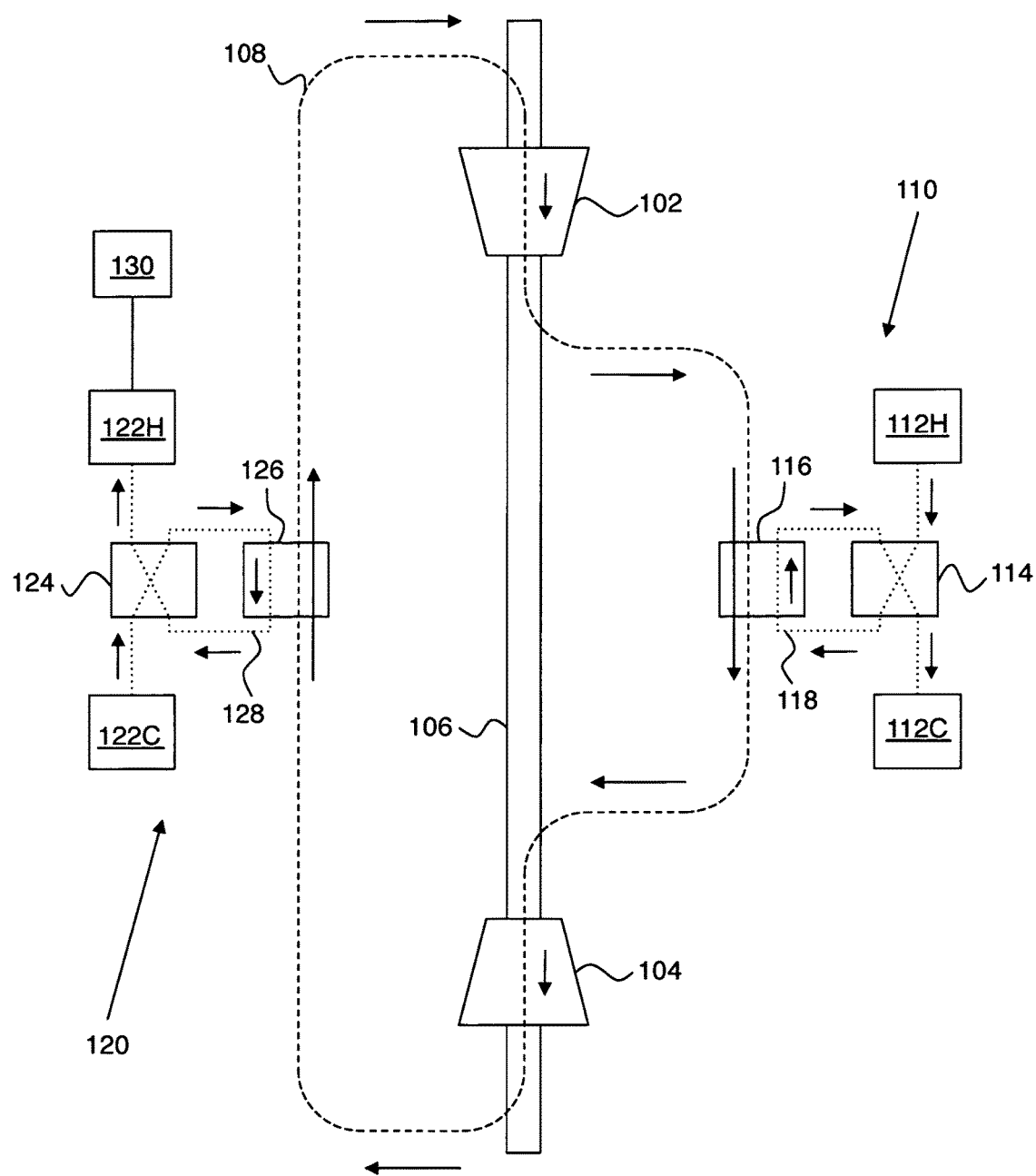
FIG. 2 shows operation of the example of FIG. 1 in a heat engine mode that uses heat energy to provide mechanical work.
Figure 3:
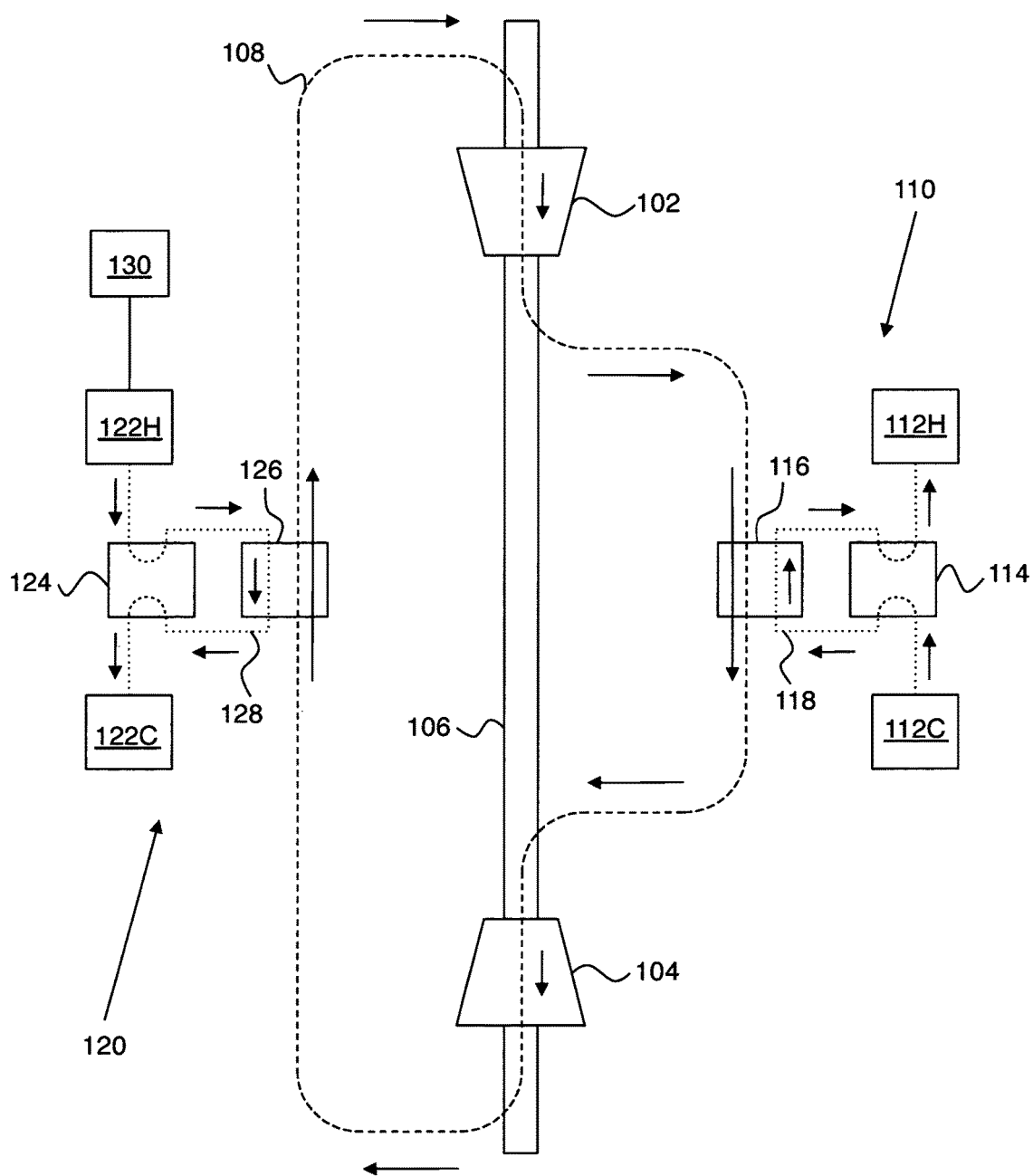
FIG. 3 shows operation of the example of FIG. 1 in a refrigerator mode that uses mechanical work to store heat energy.

Heat storage units 110 and 120 preferably have several features to improve efficiency, as shown on FIGS. 1-3. First heat storage unit 110 preferably includes a first hot heat storage tank 112H, a first cold heat storage tank 112C, a first heat storage fluid 118 capable of flowing between tanks 112H and 112C to store or release heat, and a first counter-flow heat exchanger 116. In counter-flow heat exchanger 116, it is important that working fluid 108 and first heat storage fluid 118 flow in opposite directions, as shown. First heat storage unit 110 also includes a valve 114 that can switch connections between heat exchanger 116 and tanks 112H, 112C as needed for the heat engine and refrigerator modes.

Second heat storage unit 120 preferably includes a second hot heat storage tank 122H, a second cold heat storage tank 122C, a second heat storage fluid 128 capable of flowing between tanks 122H and 122C to store or release heat, and a second counter-flow heat exchanger 126. In counter-flow heat exchanger 126, it is important that working fluid 108 and second heat storage fluid 128 flow in opposite directions, as shown. Second heat storage unit 120 also includes a valve 124 that can switch connections between heat exchanger 126 and tanks 122H, 122C as needed for the heat engine and refrigerator modes.

Counter-flow heat exchangers 116 and 126 can be designed according to known principles to reduce entropy generation in the heat exchangers to negligible levels compared to the compressor entropy generation. The basic idea is to have very small temperature differences between any two fluid elements that are exchanging heat, thereby reducing entropy production (and eliminating it entirely in the idealized case).

The heat storage tanks are thermally insulated tanks that can hold a suitable quantity of the relevant heat storage fluid. In other words, the heat storage fluids are the medium of heat storage. Liquids are preferred over solids or gases because of the need for extremely rapid exchange of large amounts of heat by convective counterflow. They also allow for relatively compact storage of large amounts of energy. For example, the size of each storage unit (i.e. 110 and 120 on FIG. 1) for a 1 GW plant operating for 12 hours should be roughly 20 medium-size oil refinery tanks. Each heat exchanger (i.e. 116 and 126 on FIG. 1) should be roughly the size of a large steam locomotive boiler.

On the hot side, it is preferred that the heat storage fluid (i.e., fluid 118) be a molten salt or mixture of molten salts. A preferred molten salt is a eutectic (i.e. lowest melting point) mixture of sodium nitrate and potassium nitrate. However, any salt or salt mixture that is liquid over the operating temperature range can be employed. Such molten salts can provide numerous advantages, including low vapor pressure (which is important for safety), melting point below the creep temperature of steels, low corrosiveness, low capacity to dissolve iron and nickel, chemical stability, lack of toxicity, and low cost.

On the cold side, it is preferred that the heat storage fluid (i.e., fluid 128) be liquid water. It is important to ensure that no steam is present on the cold side, because the presence of steam creates a significant explosion hazard. Thus, 100° C. is an upper limit for the temperature of heat storage fluid 128 if water is used. As will be seen below, efficiency is improved by increasing the temperature difference at which the system operates. Accordingly, in some preferred embodiments, a mixture of water and one or more antifreeze compounds (e.g., ethylene glycol, propylene glycol and glycerol) is employed to increase the cold side temperature range to greater than 100° C. (e.g., −30° C. to 100° C.).

The example of FIG. 1 also preferably includes a radiator 130 for dissipating waste heat generated by operation of the apparatus. Preferably, the radiator is coupled to the second hot heat storage tank 122H, as shown. However, practice of the invention does not depend critically on the location of the radiator, because waste heat can also be removed at other points in the cycle.

Figure 4:
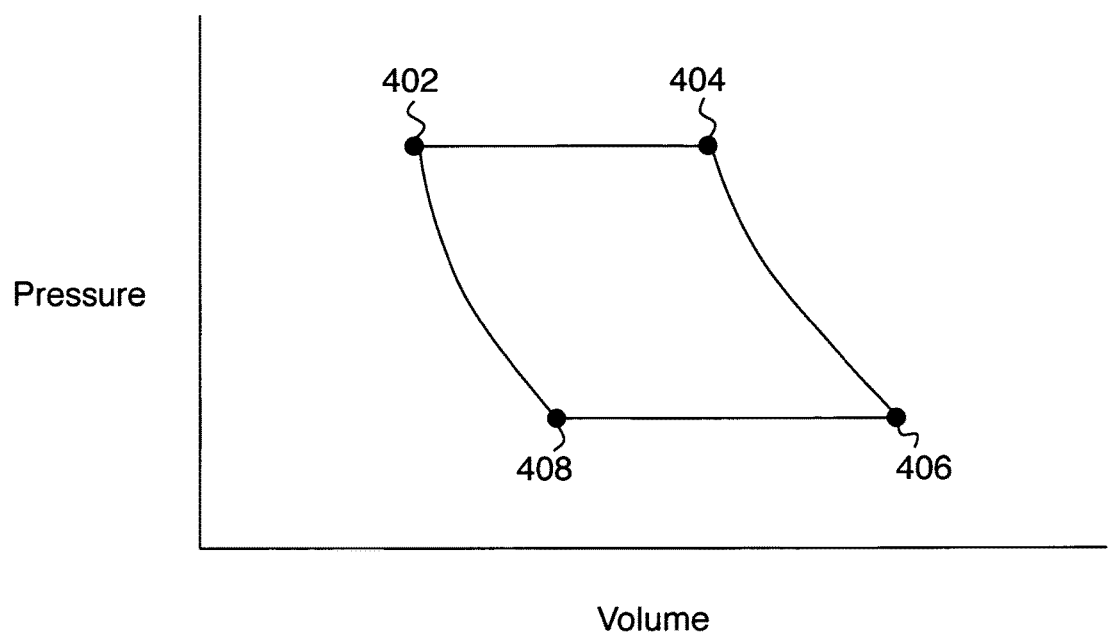
FIG. 4 shows an idealized thermodynamic Brayton cycle that relates to operation of embodiments of the invention.

Before describing further preferred features of some embodiments of the invention, it will be helpful to consider the heat engine and refrigerator modes of this apparatus, in connection with FIGS. 2-4. A idealized thermodynamic Brayton cycle is shown on FIG. 4 as a pressure-volume diagram.

FIG. 2 shows operation of the example of FIG. 1 in a heat engine mode that uses heat energy to provide mechanical work. Here it is assumed that the hot-side storage tanks 112H and 112C have substantially different fluid temperatures (e.g., as would result from prior operation of the apparatus to store energy). Working fluid 108 at the input of compressor 102 is represented by point 408 on FIG. 4. Compression of working fluid 108 moves the system to point 402 on FIG. 4. Heat is added by heat storage unit 110 to move the system from 402 to 404 on FIG. 4. More specifically, valve 114 provides connections as shown such that heat storage fluid flows from tank 112H to tank 112C through heat exchanger 116, thereby providing heat to working fluid 108. Working fluid 108 expands in turbine 104 to move the system from 404 to 406 on FIG. 4. Mechanical energy is provided by the apparatus in this mode, because the work released by expanding from 404 to 406 on FIG. 4 is greater than the work required to compress from 408 to 402 on FIG. 4.

Importantly, the thermodynamic cycle of FIG. 4 is closed by connecting the exhaust of turbine 104 to the input of compressor 102 through the cold-side heat storage unit 120. Heat is removed from working fluid 108 by heat storage unit 120 to move the system from 406 to 408 on FIG. 4. More specifically, valve 124 provides connections as shown such that heat storage fluid flows from tank 122C to tank 122H through heat exchanger 126, thereby storing heat provided by working fluid 108. This step can be understood as storing the heat energy present in the (hot) exhaust from turbine 104. Hot-side heat storage unit 110 and cold-side heat storage unit 120 have comparable total heat capacity. The need for this can be appreciated in connection with the generation mode of FIG. 2, where it is apparent that cold-side heat storage unit 120 stores a fraction of the heat stored in hot-side heat storage unit 110 (i.e., the fraction of the stored hot-side heat that ends up in the exhaust from turbine 104).

FIG. 3 shows operation of the example of FIG. 1 in a refrigerator mode that uses mechanical work to store heat energy. Working fluid 108 at the input of compressor 102 is represented by point 406 on FIG. 4. Compression of working fluid 108 moves the system to point 404 on FIG. 4. Heat is removed by heat storage unit 110 to move the system from 404 to 402 on FIG. 4. More specifically, valve 114 provides connections as shown such that heat storage fluid flows from tank 112C to tank 112H through heat exchanger 116, thereby removing heat from working fluid 108. Working fluid 108 expands in turbine 104 to move the system from 402 to 404 on FIG. 4. Mechanical energy must be provided to the apparatus in this mode, because the work released by expanding from 402 to 408 on FIG. 4 is less than the work required to compress from 406 to 404 on FIG. 4.

Importantly, the thermodynamic cycle of FIG. 4 is closed by connecting the exhaust of turbine 104 to the input of compressor 102 through the cold-side heat storage unit 120. Heat is added to working fluid 108 by heat storage unit 120 to move the system from 408 to 406 on FIG. 4. More specifically, valve 124 provides connections as shown such that heat storage fluid flows from tank 122H to tank 122C through heat exchanger 126, thereby providing heat to working fluid 108. This step can be understood as warming up the (cold) exhaust from turbine 104.

From the preceding description, it is apparent that in either mode of operation, two of the storage tanks 112H, 112C, 122H, and 112C will be feeding heat storage fluid to the system, and the other two tanks will be receiving heat storage fluid. The feed tanks set their own temperatures. The receiving tanks see fluid temperatures that depend on how the system is operating—i.e., its loads and/or power input. Ideally, the receiving tank fluid temperatures are set by the Brayton cycle conditions, but in practice there will be deviations from these conditions, and the pressure ratio varies in response to system demand.

A system controller (not shown) controls system parameters in order to approximately match the ideal temperature conditions. Suitable system parameters include but are not limited to: the flow rate of first heat storage fluid 118, the flow rate of second heat storage fluid 128, and operating parameters of compressor 102 and turbine 104 such as turbine stator blade positions. Because of entropy creation within the system, it will not be possible to match the ideal temperature conditions exactly, and at least one of the four tank temperatures will be too high. The purpose of radiator 130 is to reject this waste heat to the environment as part of system control. Suitable techniques for controlling systems as described herein are known in the art.

Some principles of the present invention can be better appreciated in connection with a specific example where hot-side heat storage fluid 118 is a molten salt and cold-side heat storage fluid 128 is water. In this example, there is a water side and a salt side, each characterized by two temperatures. However, these 4 temperatures are not independent of each other. Each salt temperature is the product of the corresponding water temperature and a factor that depends on the compressor pressure ratio (numerically, this factor is typically about 2). Thus, in steady state operation, there are only two independent temperatures. The water temperatures need to be in the liquid range for water (at 1 atmosphere) for safety, and the salt temperatures need to be in the liquid range for the relevant salt, and be at a temperature range that structural steels can handle. Fortunately, salts that are molten at temperatures on the order of 450-700 K are known, and such temperatures are well below typical steel melting or creep temperatures.

To better appreciate the present approach, it is helpful to note that it is possible to perform energy storage and retrieval without using a closed cycle for working fluid 108. More specifically, the cold-side heat storage unit 120 could be removed from FIG. 1, thereby opening the cycle such that the compressor input is provided by the environment, and the turbine exhausts to the environment.

However, this open-cycle approach has numerous and severe disadvantages. The open-cycle approach entails employing atmospheric air as the cold-side heat reservoir. This automatically precludes the use of any working fluid other than air. It also precludes the use of counterflow heat exchange to minimize entropy production. It also exposes the system to environmental dangers, for example humidity fluctuations that could cause condensation or even freezing of water in the turbine operating in refrigerator mode, with total destruction of the turbine as the likely result.

A particularly important modification of the working fluid allowed by a closed cycle is pressurization. This enables the input pressure to compressor 102 to be higher than atmospheric pressure. It is helpful to consider the minimum pressure ($P_{min}$) of working fluid 108 in its closed cycle. The minimum pressure is typically found on the cold side of the apparatus (e.g., at the input to compressor 102). Although $P_{min}$ can be as low as 1 atmosphere (atm), it is preferred for $P_{min}$ to be about 10 atmospheres or greater.

This increase in power density provided by a high-pressure working fluid can be extremely significant. A storage turbine at 1 atm pressure generates about 1/10 the power of a combustion turbine of the same size. This can be seen by comparing the exhaust temperatures. For example, a large commercial power gas turbine has an output of 256 megawatts, a compression ratio of 15.3 and an exhaust temperature of 608° C. (i.e. 578° C. greater than the intake temperature). For a storage turbine based on air, which might have a compression ratio of 14 and an exhaust temperature rise (retrieval step) of 75° C., the same size as the above commercial power turbine and flowing the same amount of working fluid (643 kg/sec), the resulting power is (256 MW) (75° C.)/(578° C.)=33.2 MW. This is absurdly low for such a large machine.

To put this problem in perspective, the throat intake speed of industrial gas turbines is typically a significant fraction of the sound speed in air (e.g., Mach 0.5). Since sea level air has a mass density of 1.22 kg/m$^3$ and a sound speed of 343 m/s, the throat area required to accommodate the mass flow is about 3 m$^2$. The power required merely to accelerate the air mass in question to Mach 0.5 is about 9.5 MW. Some of this power can be recovered from exhaust hydrodynamics, but not all, and the lost part is comparable to the energy one is trying to extract.

Thus it is important that the power output of the turbine of a given size be substantially raised. This can be done by raising the ambient pressure of the working fluid. If, for example, the pressure is raised to 10 atmospheres, something that steel can accommodate easily, the power output becomes 10 times what it was before, which is an amount comparable to that generated by a combustion gas turbine of the same size. The pressures and temperatures in question also feature in modern supercritical steam plants, so the steel is expected to be able to take the stress. The elevated working fluid density should also help raise the compressor efficiency, although the exact amount is difficult to estimate accurately. Water (i.e., a dense fluid) can be pumped uphill with 90% efficiency using Francis turbines. This high efficiency is what makes hydropumping the leading energy storage technology at the moment.

The closed loop also enables one to conserve momentum, as in a wind tunnel. This becomes increasingly important as the mass of the fluid rises, for then the total fluid kinetic energy passing by a point per second can become comparable to the power one is trying to store or extract. In a closed circuit this energy is automatically conserved (except for friction losses at the walls) so it doesn't reduce efficiency but in an open circuit, where kinetic energy gets lost to the environment, it does reduce efficiency.

To better appreciate some further preferred embodiments, it is helpful to provide some results from an analysis of the Brayton cycle of FIG. 4. For adiabatic compression of a gas having temperature $T_0$ and pressure $P_0$ to a pressure $P_1$, the resulting temperature $T_1$ is given by $$T_1 = T_0 (P_1/P_0)^{\frac{\gamma-1}{\gamma}}, \qquad (1)$$

where γ is the heat capacity ratio (i.e., $C_p/C_v$) of the gas. The heat dumped to the environment per mole of working fluid compressed ($Q_{dump}$) is given by $$Q_{dump} = (1-\eta_c)\frac{RT_e}{\gamma-1}\left[1-(P_0/P_1)^{\frac{\gamma-1}{\gamma}}\right], \quad (2)$$

where R is the ideal gas constant, $\eta_c$ is the compressor efficiency, and $T_e$ is the environment temperature. It is assumed that the compressor is the dominant source of entropy production in the cycle. This assumption is reasonable in view of the use of counter-flow heat exchangers and the high efficiencies provided by turbines in practice. The energy stored per mole of working fluid compressed ($E_{store}$) is given by $$E_{store} = \frac{\gamma}{\gamma-1}R\Delta T\left[1-(P_0/P_1)^{\frac{\gamma-1}{\gamma}}\right], \quad (3)$$

where ΔT is the temperature difference between the hot and cold storage tanks (e.g., 112H and 112C). The thermodynamic efficiency of energy storage ($\eta_{store}$) is given by $$\eta_{store} = 1 - \frac{Q_{dump}}{E_{store}} = 1 - \frac{(1-\eta_c)}{\gamma}\frac{T_e}{\Delta T}. \quad (4)$$

For a numerical example, let $P_1/P_0=14$, $\eta_c=0.9$, $T_e=300$ K, ΔT=150 K and γ=1.4. The resulting storage efficiency is $\eta_{store}=0.857$. The efficiency of retrieval is the same as for storage, so the total efficiency for storage+retrieval is $\eta_{store}^2$.

From these results, several further preferred features may be understood. Although air can be employed as a working fluid, a preferred working fluid is Argon. Argon is inexpensive, and has better properties than air. More specifically, γ for Argon is 1.66 and γ for air is 1.4, so Argon is seen to improve the efficiency given by Eqn. 4. Commonly employed working fluids in conventional refrigerators, such as ammonia and freon, are not preferred working fluids in this context, because drops of their liquid phase may form in operation and damage the turbine blades.

The effect of the use of Argon instead of air as the working fluid can be better appreciated in view of some compressor design considerations. The compressor is the dominant source of inefficiency in the present apparatus. Axial compressors, (e.g. those in jets and as shown on FIGS. 1-3) tend to be the most efficient kind of compressor, particularly in applications requiring large volume flows. The fundamental limit of efficiency per stage in an axial compressor is about $\eta_s=0.9$. The overall compressor efficiency degrades with stage number n according to:

$$\eta_c = \frac{r^{n(\gamma-1)/\gamma}-1}{r^{n(\gamma-1)/\eta_s\gamma}-1} \quad (5)$$

where $$r = \left[\frac{P_1}{P_0}\right]^{1/n}.$$

Figure 5:
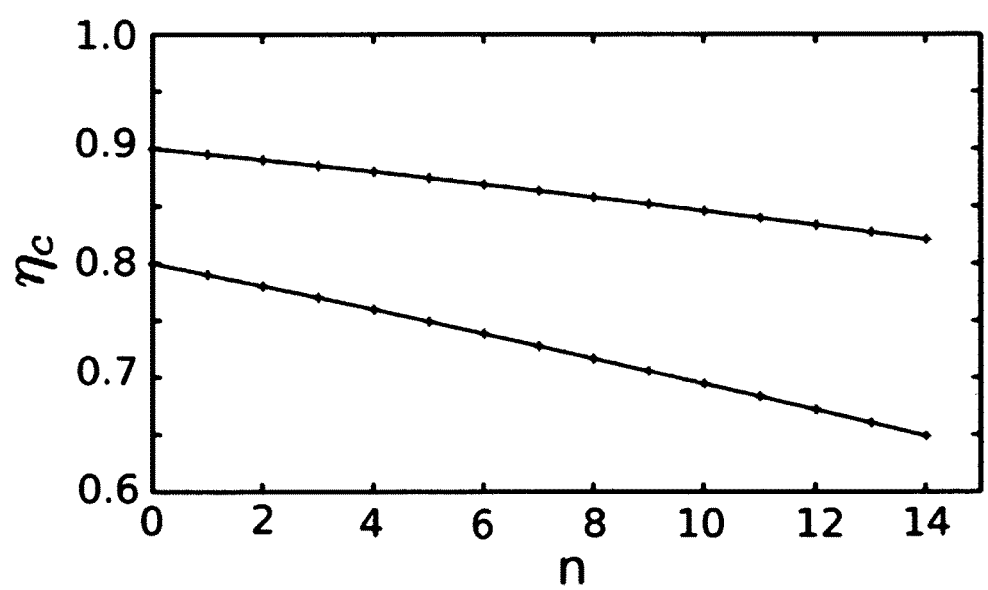
FIG. 5 show plots of compressor efficiency vs. number of compressor stages.

FIG. 5 shows plots of $\eta_c(n)$ for $\eta_s=0.9$ (top curve) and $\eta_s=0.8$ (bottom curve). The compression ratio per stage is taken to be r=1.4, and the specific heat ratio is taken to be γ=1.4. For $P_1/P_0=14$ as in the preceding example, the number of stages required is 7.8 (which rounds to 8). This number of stages degrades the overall compressor efficiency to 0.86 and reduces the storage-step efficiency to $\eta_{store}=0.80$. The retrieval-step efficiency is the same, so the round-trip storage efficiency is the square of this number, or 0.64.

Thus there is a significant premium in increasing the stage efficiency even by a tiny amount and thereby reducing the number of stages. Substituting Ar for air as the working fluid, for example, increases the specific heat ratio to γ=1.66, reduces the overall compression ratio required from 14 to 6.7, and thus reduces the number of stages to 5.6 (which rounds to 6). The storage-step efficiency then rises to 0.84, which gives 0.71 when squared.

It is also clear from Eqn. 4 that there is a significant efficiency advantage in maximizing the temperature difference $\Delta T_H$ between the tanks on the hot side of the circuit. This is related by the Brayton cycle condition to the temperature difference $\Delta T_C$ between the tanks on the cold side of the circuit by $$\Delta T_H = (P_1/P_0)^{(\gamma-1)/\gamma}\Delta T_C. \quad (6)$$

For $P_1/P_0=14$, γ=1.4 (i.e., air), and $\Delta T_C=75$ K, the resulting $\Delta T_H$ is about 150K (more specifically, it is 159 K). The value for $\Delta T_C$ in this example is a conservative liquid range for water. It is highly undesirable to pressurize the water to allow temperatures greater than 100° C., on account of the extreme explosion danger thereby created. Thus the only practical way to increase this range is extend the cold side to below room temperature. One can obtain a further 25 K by going down to the freezing point of water and a further 30 K if antifreeze is added as described above. Assuming $\Delta T_C=130$ K, the hot-side temperature difference then becomes $\Delta T_H=276$ K which gives a corresponding storage efficiency of $\eta_{store}=0.91$.

In the preceding two examples, the effects of using Argon as the working fluid and of increasing the cold-side temperature difference were considered separately for ease of explanation. These approaches for improving efficiency can be practiced simultaneously, and can also be practiced in combination with any other ways of improving efficiency (e.g., operating at higher pressures). Preferably, efficiency is maximized by making use of all available methods of increasing efficiency. For example, the choice of working fluid can be considered and optimized in combination with compressor/turbine optimization.

The invention claimed is:
1. Energy storage and retrieval apparatus comprising:
a compressor;
a first heat storage unit;
a turbine that is a separate unit from the compressor;
a second heat storage unit; and
a working fluid that flows in a closed cycle including, in sequence, the compressor, the first heat storage unit, the turbine, and the second heat storage unit, wherein the first heat storage unit and the second heat storage unit are in the same closed cycle;
wherein the compressor and the turbine have a common mechanical shaft such that both the compressor and the turbine rotate together upon flow of the working fluid through the closed cycle;
wherein the first and second heat storage units are both capable of exchanging heat with the working fluid;

wherein the apparatus reversibly operates as both (i) a heat engine to provide mechanical work from heat and (ii) as a refrigerator to use mechanical work to store heat; and wherein the working fluid flows through, in sequence, the compressor, the first heat storage unit, the turbine, and the second heat storage unit when the apparatus operates as the refrigerator and when the apparatus operates as the heat engine.

2. The apparatus of claim 1, wherein the first heat storage unit comprises:
a first hot (1-H) heat storage tank;
a first cold (1-C) heat storage tank;
a first heat storage fluid capable of flowing between the 1-H and 1-C heat storage tanks to store or release heat; and
a first counter-flow heat exchanger, wherein the first heat storage fluid and the working fluid flow in opposite directions.

3. The apparatus of claim 2, wherein the first heat storage fluid comprises molten salt.

4. The apparatus of claim 3, wherein the molten salt comprises a eutectic mixture of sodium nitrate and potassium nitrate.

5. The apparatus of claim 2, wherein the second heat storage unit comprises:
a second hot (2-H) heat storage tank;
a second cold (2-C) heat storage tank;
a second heat storage fluid capable of flowing between the 2-H and 2-C heat storage tanks to store or release heat; and
a second counter-flow heat exchanger, wherein the second heat storage fluid and the working fluid flow in opposite directions.

6. The apparatus of claim 5, wherein the second heat storage fluid comprises water.

7. The apparatus of claim 6, wherein the second heat storage fluid further comprises an antifreeze compound.

8. The apparatus of claim 1, further comprising a radiator operatively coupled to the apparatus to dissipate waste heat that may be generated during operation of the apparatus.

9. The apparatus of claim 1, wherein a minimum pressure of the working fluid in the closed cycle is about one atmosphere.

10. The apparatus of claim 1, wherein a minimum pressure of the working fluid in the closed cycle is greater than ten atmospheres.

11. The apparatus of claim 1, wherein a minimum pressure of the working fluid in the closed cycle is about 200 atmospheres.

12. The apparatus of claim 1, wherein the working fluid is air.

13. The apparatus of claim 1, wherein the working fluid is Ar.

14. A method for storing and releasing energy, the method comprising:
providing a system comprising a closed cycle for a working fluid such that the working fluid flows through, in sequence, a compressor, a first heat storage unit, a turbine that is a separate unit from the compressor, and a second heat storage unit, wherein the first heat storage unit and the second heat storage unit are in the same closed cycle;
wherein the compressor and the turbine have a common mechanical shaft such that both the compressor and the turbine rotate together upon flow of the working fluid through the closed cycle, and wherein the first and second heat storage units are both capable of exchanging heat with the working fluid;
reversibly operating the system in a refrigerator mode and a heat engine mode, wherein in the refrigerator mode, mechanical work provided by the common mechanical shaft is used to transfer heat energy from the second heat storage unit to the first heat storage unit, and wherein in the heat engine mode, heat energy transferred from the first heat storage unit to the second heat storage unit is used to rotate the common mechanical shaft; and
wherein, the working fluid flows through, in sequence, the compressor, the first heat storage unit, the turbine, and the second heat storage unit in both the refrigerator mode and the heat engine mode.

15. The method of claim 14, further comprising controlling the temperature difference between fluid elements exchanging heat such that an entropy generation in the first and second heat storage units is minimized.

16. The method of claim 14, wherein an entropy generated in the first and second heat storage units is negligible when compared to an entropy generated by the compressor.

17. The method of claim 14, wherein the first heat storage unit or the second heat storage unit comprises a heat storage fluid.

18. The apparatus of claim 1, wherein the first heat storage unit or the second heat storage unit comprises a heat storage fluid.

19. The apparatus of claim 1, wherein the first heat storage unit and the second heat storage unit comprise a heat storage fluid.

20. The apparatus of claim 1, wherein the second heat storage unit comprises a storage fluid held at about ambient pressure.

* * * * *